(12) United States Patent
Chao et al.

(10) Patent No.: US 9,344,717 B2
(45) Date of Patent: May 17, 2016

(54) METHOD AND APPARATUS FOR SAMPLE ADAPTIVE OFFSET IN A VIDEO DECODER

(71) Applicant: MEDIATEK INC., Hsin-Chu (TW)

(72) Inventors: Ping Chao, Taipei (TW); Yung-Chang Chang, New Taipei (TW); Chi-Cheng Ju, Hsinchu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 329 days.

(21) Appl. No.: 13/887,836

(22) Filed: May 6, 2013

(65) Prior Publication Data

US 2014/0036991 A1 Feb. 6, 2014

Related U.S. Application Data

(60) Provisional application No. 61/680,104, filed on Aug. 6, 2012, provisional application No. 61/712,934, filed on Oct. 12, 2012.

(51) Int. Cl.
*H04N 19/117* (2014.01)
*H04N 19/82* (2014.01)
(Continued)

(52) U.S. Cl.
CPC ....... *H04N 19/00066* (2013.01); *H04N 19/423* (2014.11); *H04N 19/82* (2014.11); *H04N 19/86* (2014.11)

(58) Field of Classification Search
CPC . H04N 19/0066; H04N 19/423; H04N 19/82; H04N 19/86
USPC ................................................... 375/240.02
See application file for complete search history.

(56) References Cited

U.S. PATENT DOCUMENTS

2011/0305274 A1 12/2011 Fu et al.
2012/0177103 A1 7/2012 Fu
(Continued)

FOREIGN PATENT DOCUMENTS

WO 2011087932 A1 7/2011
WO 2012152174 A1 11/2012
WO 2013053324 A1 4/2013

OTHER PUBLICATIONS

CW Hsu et al., source: branches/HM-2.2-dev-mediatek/source/Lib/TLibCommon/TComAdaptiveLoopFilter.cpp @ 842, Apr. 15, 2011, https://hevc.hhi.fraunhofer.de/trac/hevc/browser/branches/HM-2.2-dev-mediatek/source/Lib/TLibCommon/TComAdaptiveLoopFilter.cpp?rev=842.
(Continued)

*Primary Examiner* — William C Vaughn, Jr.
*Assistant Examiner* — Jae N Noh
(74) *Attorney, Agent, or Firm* — Winston Hsu; Scott Margo

(57) ABSTRACT

A method and apparatus for SAO (sample adaptive offset) processing in a video decoder are disclosed. Embodiments according to the present invention reduce the required line buffer associated with the SAO processing. According to one embodiment, tri-level comparison results for one deblocked pixel row or column of the image unit are determined according to SAO type of the deblocked pixel row or column. The tri-level comparison results are stored in a buffer and the tri-level comparison results are read back from the buffer for SAO processing of the subsequent row or column from a subsequent image unit. The comparison results correspond to "larger", "equal" and "smaller" states. The comparison results can be stored more efficiently.

20 Claims, 10 Drawing Sheets

(51) Int. Cl.
*H04N 19/423* (2014.01)
*H04N 19/86* (2014.01)

(56) References Cited

U.S. PATENT DOCUMENTS

| | | | |
|---|---|---|---|
| 2012/0177107 A1 | 7/2012 | Fu | |
| 2013/0022104 A1* | 1/2013 | Chen | H04N 19/70 375/240.02 |
| 2013/0114681 A1* | 5/2013 | Zhao | H04N 19/865 375/240.03 |
| 2013/0163677 A1 | 6/2013 | Sze et al. | |

OTHER PUBLICATIONS

Woo-Shik Kim, AhG6: SAO Parameter Estimation Using Non-deblocked Pixels, Joint Collaborative Team on Video Coding (JCT-VC) of ITU-T SG 16 WP3 and ISO/IEC JTC 1/SC 29/WG 11, 10th Meeting: Stockholm, SE, Jul. 11-20, 2012, pp. 1-7, Document: JCTVC-J0139, M25462, XP030112501.

Andrew Segall et al., Unified Deblocking and SAO, Joint Collaborative Team on Video Coding (JCT-VC) of ITU-T SG16 WP3 and ISO/IEC JTC1/SC29/WG11, 7th Meeting: Geneva, Nov. 21-30, 2011, pp. 1-5, Document: JCTVC-G608, WG11 Number: m22174, XP030110592.

* cited by examiner

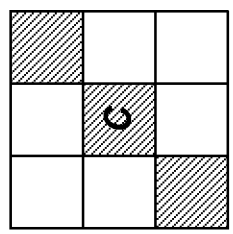
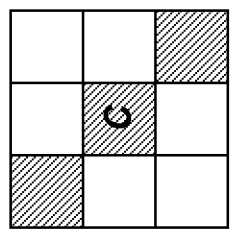
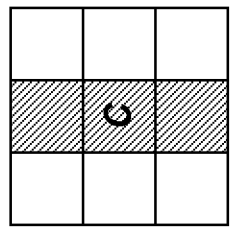
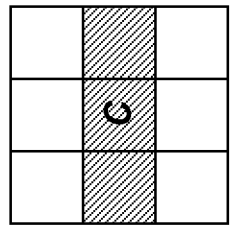
Fig. 3

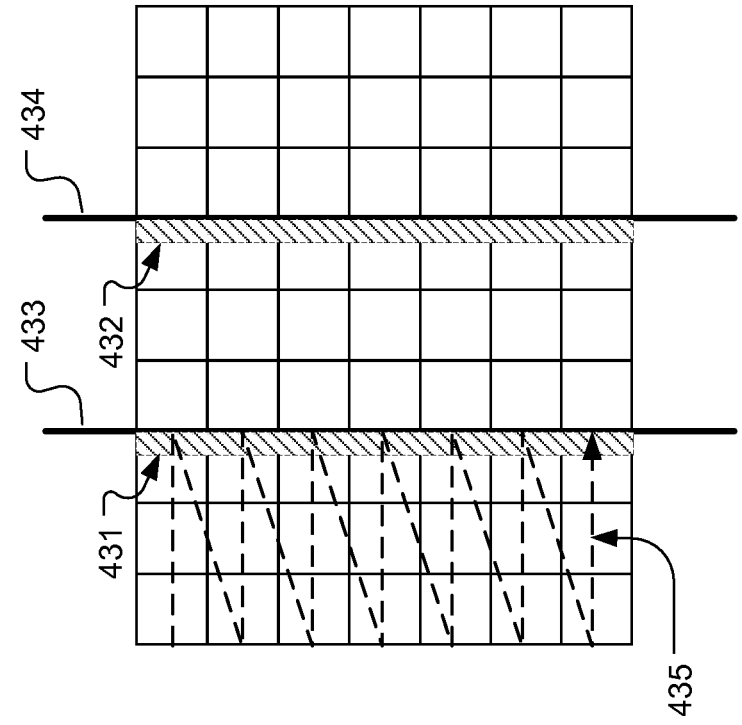
Fig. 4C
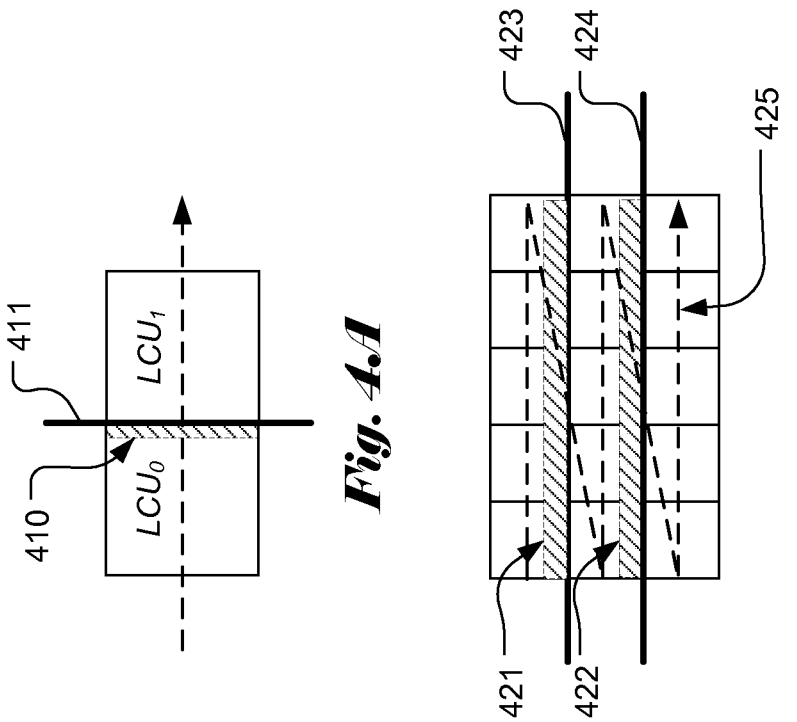
Fig. 4A
Fig. 4B

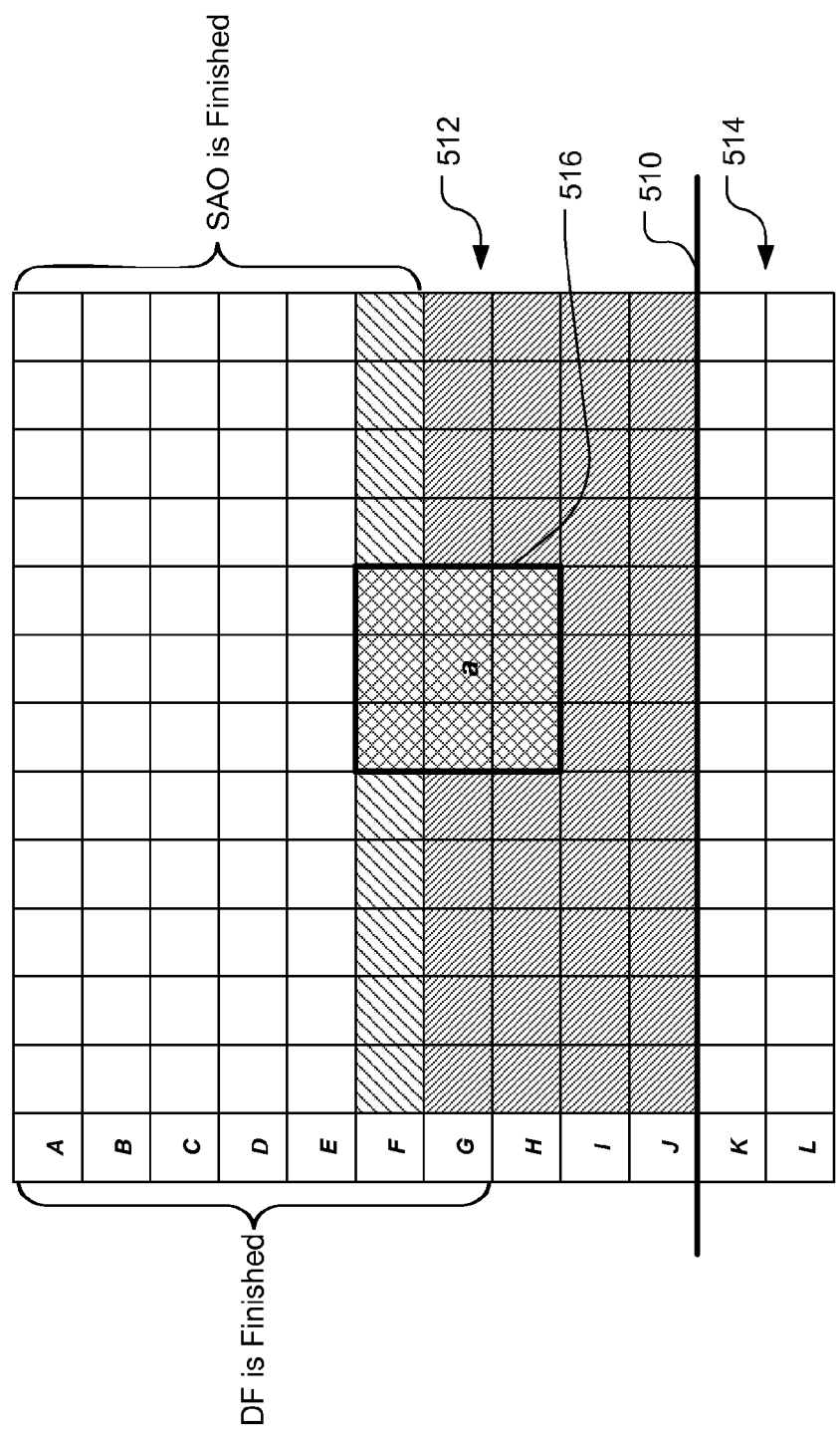

METHOD AND APPARATUS FOR SAMPLE ADAPTIVE OFFSET IN A VIDEO DECODER

CROSS REFERENCE TO RELATED APPLICATIONS

The present invention claims priority to U.S. Provisional Patent Application No. 61/680,104, filed on Aug. 6, 2012, entitled "Method and Apparatus for Video Decoding Process in Sample Adaptive Offset" and U.S. Provisional Patent Application No. 61/712,934, filed on Oct. 12, 2012, entitled "Method and Apparatus for Video Decoding Process in Deblocking Filter and Sample Adaptive Offset with Reduced Pipeline Buffer and Process Latency". These U.S. Provisional Patent Applications are hereby incorporated by reference in their entireties.

FIELD OF THE INVENTION

The present invention relates to video decoding. In particular, the present invention relates to method and apparatus for video decoding process incorporating deblocking and sample adaptive offset (SAO).

BACKGROUND

In video coding, various technologies have been developed to improve the coding efficiency by reducing the compressed video bitrate with comparable video quality. With more and more demands for higher resolution video (high-definition and beyond HD resolutions), there are increasing needs of even higher efficiency in video coding than previous standards. This leads to the standard development of High-Efficiency Video Coding (HEVC). HEVC incorporates many video coding tools to substantially improve video coding efficiency and meet the requirement of diverse applications. A typical HEVC decoder employs processes including entropy decoding, inverse scaling and quantization, inverse transformation, intra-picture prediction, inter-picture prediction, and in-loop filters.

The Deblocking Filter (DF) and Sample Adaptive Offset (SAO) filter are in-loop filters used by HEVC. An SAO filter adds an adaptive offset to the reconstructed pixel to compensate for distortions in reconstruction.

FIG. 1 illustrates an exemplary of HEVC decoding system incorporating sample adaptive offset (SAO) which is used in HEVC Test Model 7.0 (HM-7.0). Bitstream from coding unit is decoded by entropy decoding 110, output of which includes intra mode information which is fed into intra prediction 111, inter mode information which is fed into motion compensation (MC) 112, adaptive loop filter information which is fed into adaptive loop filter 133, sample adaptive offset information which is fed into sample adaptive offset 132, and residues which are fed into inverse quantization (IQ) 120. For intra prediction, intra prediction data is provided by intra prediction 111 based on intra mode information from entropy decoding 110. For inter-prediction, motion compensation (MC) 112 is used to provide reference picture data based on inter mode information and previously reconstructed video data from other picture or pictures. Either intra prediction data or inter-prediction data depending on the mode is provided to reconstruction (REC) 122 for the reconstruction of video data. The residues of entropy decoded data are processed by inverse quantization (IQ) 120 followed by inverse transformation (IT) 121 to recover the residues. The recovered residues are then supplied to REC 122 combining with predicted data to reconstruct the video data. The reconstructed video data from REC will be used for reconstruction of subsequent blocks in the same picture (intra mode) or reconstruction of other pictures (inter mode). For inter mode, the reconstructed video data is stored in reference picture buffer 133. However, loop filters are usually applied to the reconstructed video data before it is stored. In FIG. 1, the reconstructed video data is filtered by three filters which are respectively the deblocking filter (DF) 130, the SAO 131 and the adaptive loop filter (ALF) 132. DF is applied to reconstructed video data first. SAO 131 is then applied to deblocked video data from DF 130. Sample adaptive offset information from entropy decoding 110 is provided to SAO 131 for proper SAO operation. ALF 132 is applied to processed video data from SAO 131. Adaptive loop filter information from entropy decoding is applied to ALF 132 for proper ALF operation. The processed reconstructed video data from ALF 132 is then stored in reference picture buffer 133 and used by MC 112 to generate reference picture for prediction of other frames.

As shown in FIG. 1, in the High Efficiency Video Coding (HEVC) decoder, three in-loop filters, DF, SAO and ALF are applied to the reconstructed video data to improve the quality of the reconstructed video data. The DF 130 is applied to boundary pixels and the DF processing is dependent on the underlying pixel data of the reconstructed video data and coding information associated with corresponding blocks. On the other hand, the SAO and ALF processing are adaptive, where filter information such as filter parameters and filter type may be dynamically determined by analysis of the underlying video data at the encoder side. Therefore, filter information associated with SAO and ALF is incorporated in the video bitstream so that the decoder can properly recover the required information for SAO and ALF. During decoding, filter information is decoded and provided to respective SAO and ALF for proper operation.

The decoding process as well as coding process in HEVC is applied according to Largest Coding Unit (LCU). The LCU is adaptively partitioned into coding units using a quadtree. In each leaf CU, DF filtering is first applied to boundary pixels of each block. Then following DF, SAO filtering is applied to all applicable pixels for each block. In HEVC Test Model Version 7.0 (HM-7.0), DF applies to block boundaries of each 8×8 block. For each 8×8 block, horizontal filtering across vertical block boundaries is first applied, and then vertical filtering across horizontal block boundaries is applied. FIG. 2A illustrates an example of a vertical block boundary 210 with 4 boundary pixels on each side of the block boundary. The boundary pixels are designated as q0, q1, q2 and q3, and p0, p1, p2 and p3, where q0 and p0 are two pixels immediately adjacent to the vertical boundary. FIG. 2B illustrates an example of a horizontal block boundary 220 with 4 boundary pixels on each side of the block boundary. Again, the boundary pixels are designated as q0, q1, q2 and q3, and p0, p1, p2 and p3, where q0 and p0 are two pixels immediately adjacent to the horizontal boundary. For each picture, boundary pixel rows across one or more vertical boundaries can be horizontally filtered in parallel to improve processing speed. After horizontal filtering across vertical boundaries, boundaries pixel columns across one or more horizontal boundaries can be vertically filtered in parallel.

Sample adaptive offset (SAO) is also adopted in HM-7.0, as shown in FIG. 1. SAO is a per-pixel in-loop filtering. SAO can divide one picture into multiple LCU-aligned regions, and for each region one SAO type is determined to be one of the following types: two Band Offset (BO) types, four Edge Offset (EO) types, and no processing (OFF). Then for each SAO type, different type of filtering method should be applied. For BO type, each to-be-processed pixel is mapped into a band based on the pixel's intensity. The full range of pixel intensity is equally divided into 32 bands. One offset is derived for all pixels of each band, and the offsets are selected and coded. For EO type, pixel classification is first done to classify pixels into different groups (also called categories or classes). The pixel classification for each pixel is based on a calculation of gradient using a 3×3 window, as shown in FIG. 3 where four configurations corresponding to 0°, 90°, 135°, and 45° are used for classification.

Upon classification of all pixels in a picture or a region, one offset is derived and transmitted for each group of pixels. In HM-7.0, SAO is applied to Luma and Chroma components, and each of the Luma components is independently processed. One offset is derived for all pixels of each category except for category 4 of EO, where Category 4 is forced to use zero offset. Table 1 below lists the EO pixel classification, where "C" denotes the pixel to be classified.

TABLE 1

| Category | Condition |
| --- | --- |
| 0 | C < two neighbors |
| 1 | C < one neighbor && C == one neighbor |
| 2 | C > one neighbor && C == one neighbor |
| 3 | C > two neighbors |
| 4 | None of the above |

In HEVC system, SAO can substantially enhance coding efficiency. However, SAO involves multiple neighboring pixel data when calculating the gradient for each pixel. For example, for the EO type, the calculation of the gradient in SAO is based on a 3 by 3 window of pixels with the to-be-processed pixel in the center. Due to this neighboring pixel referencing, SAO needs to buffer decoded video data of neighboring lines in the decoding system. This additional line buffer needs to be implemented as additional internal memory or an external memory. In the HEVC standard, the LCUs in a picture may be divided in tiles so that the picture can be processed in a tile by tile fashion. The LCUs in a picture may also be divided into LCU rows for LCU row based processing. The boundaries between tiles or between LCU rows may require larger size of the line buffer for SAO processing. Additional internal memory or external memory results in higher hardware cost of the decoding system. Therefore, it is desirable to reduce the required data size for SAO processing across tile boundaries or LCU-row boundaries.

BRIEF SUMMARY OF THE INVENTION

A method and apparatus for video decoding process in an HEVC video decoder incorporating deblocking and sample adaptive offset (SAO) processing is disclosed. Embodiments according to the present invention reduce the required line buffer size associated with SAO process across tile boundaries or LCU-row boundaries. Different SAO types, including the boundary offset (BO) types, the edge offset (EO) types and the off (OFF) type, may be applied to image units in picture. For the EO types, additional data needs to be stored for SAO processing. According to one embodiment of the present invention, a buffer is configured to store additional data for SAO processing after deblocking filter is applied to an image unit of the reconstructed video data. The additional data to be stored for SAO processing corresponds to the tri-level comparison results for at least a portion of a deblocked pixel row or column of the image unit. The reference pixels selected for the calculation of the tri-level comparison results is based on the SAO type of the portion of the deblocked pixel row or column. The tri-level comparison results are determined by comparing the pixels of the deblocked pixel row or column with neighboring pixels of a previous row or column. The tri-level comparison results comprise "larger", "equal" and "smaller" states. During or after the deblocking filter is applied to a subsequent image unit, the tri-level comparison results are read back from the buffer for SAO processing. The image unit corresponds to a largest coding unit (LCU) or a shifted LCU. The subsequent image unit corresponds to a next LCU in LCU-row based decoding, tile based decoding, or sequential LCU based decoding.

The tri-level comparison result can be represented by two or more bits in multiple ways. According to one embodiment of the present invention, one tri-level comparison result is represented by an 8-bit data. In another embodiment, one tri-level comparison result is represented by a 2-bit data. The tri-level comparison results can be jointly represented. One embodiment uses a 5-bit data to represent three tri-level comparison results. Another embodiment uses an 8-bit data to represent five tri-level comparison results. The above representation method can be combined. In one embodiment, a 26-bit data is used to represent 16 tri-level comparison results.

In one embodiment of the present invention, the tri-level comparison result is stored in MLC storage (multi-level cell storage). Each tri-level comparison result can be stored in one cell of the MLC storage. Each cell can support three or more levels.

BRIEF DESCRIPTION OF THE DRAWINGS

FIG. 3 illustrates Edge Offset (EO) pixel classification based on a 3×3 window, with four configurations corresponding to 0°, 90°, 135°, and 45°.

FIG. 4A illustrates pixels at a vertical boundary between two LCUs involved in SAO processing across an LCU boundary.

FIG. 4B illustrates pixels at a horizontal boundary between two LCU rows involved in SAO processing across an LCU-row boundary.

FIG. 4C illustrates pixels on a vertical boundary between two tiles involved in SAO processing across a tile boundary.

FIG. 5A illustrates an example of neighboring pixel lines to be buffered for DF and SAO processing across an LCU-row boundary for Luma.

DETAILED DESCRIPTION OF THE INVENTION

Figure 1:
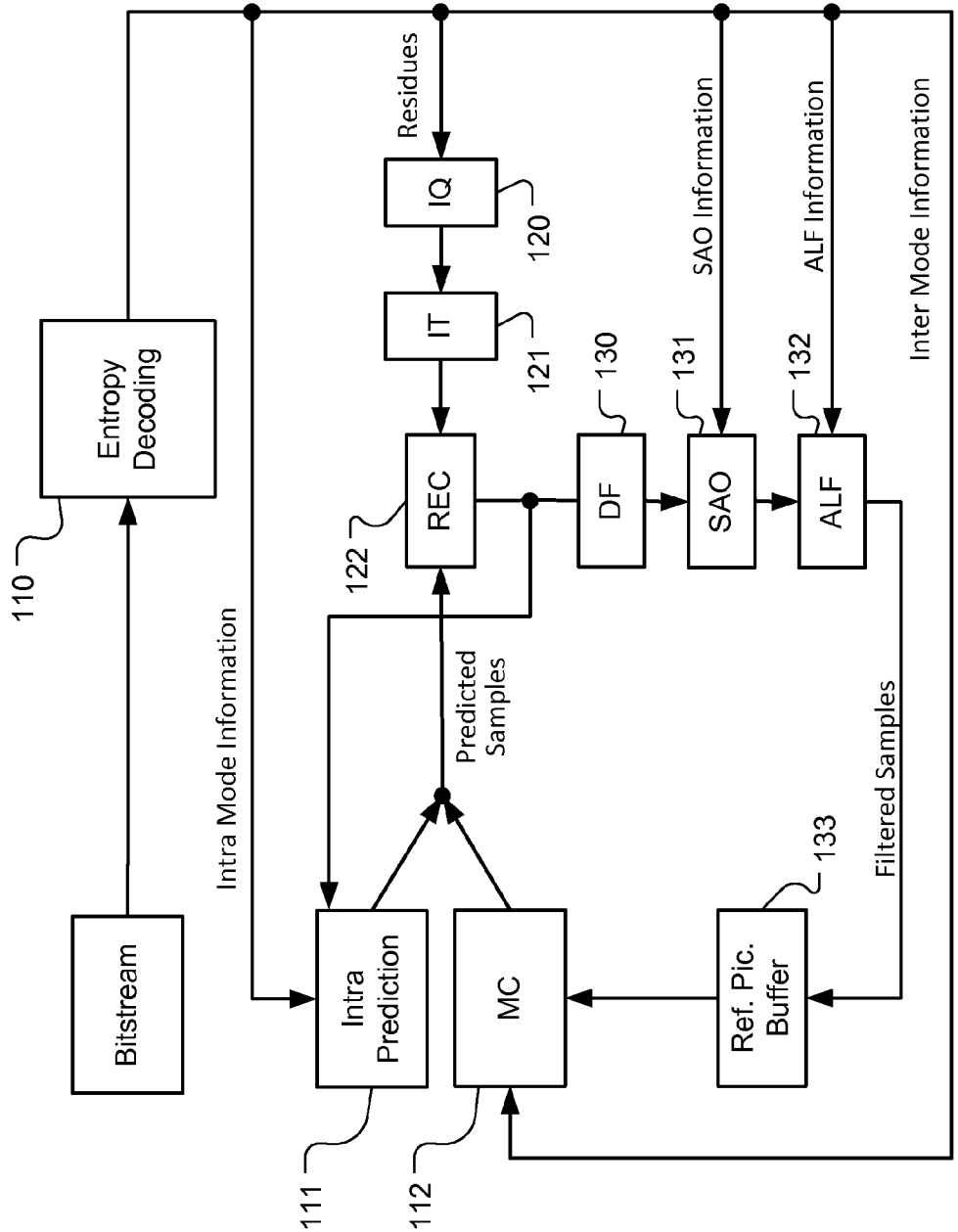
FIG. 1 illustrates an exemplary decoding system using Inter/Intra prediction of HM-7.0, where Sample Adaptive Offset (SAO) is processed after Deblocking Filter (DF).
Figure 2:
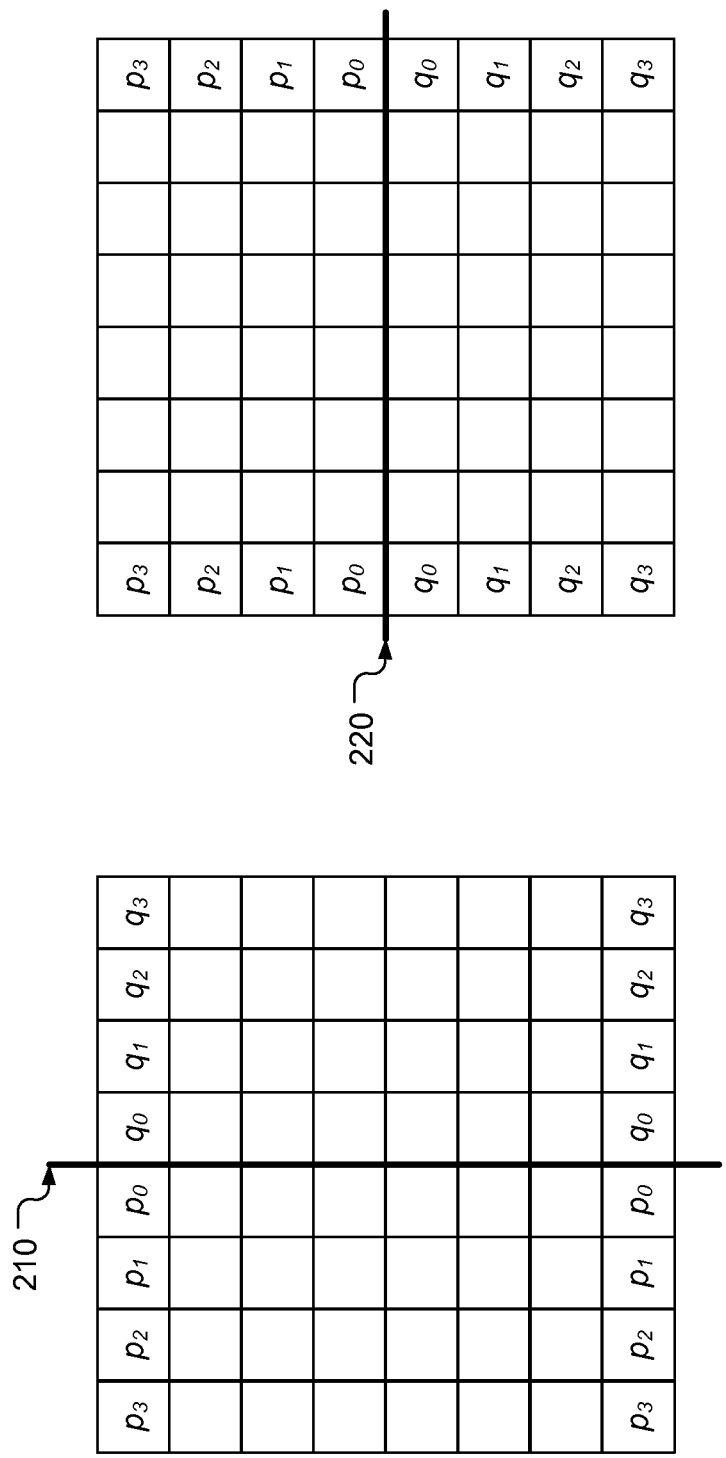
FIG. 2A illustrates pixels on both sides of a vertical boundary involved in Deblocking Filter.
FIG. 2B illustrates pixels on both sides of a horizontal boundary involved in Deblocking Filter.

Aspects of the disclosed techniques involve the deblocking filter (DF) and sample adaptive offset (SAO) filter used in HEVC. The apparatuses and methods presented in this disclosure can be used to substantially reduce the data size requirement in storing information for SAO when it is implemented in hardware. In particular, this disclosure relates to hardware implementation of SAO using block-based processing where blocks can be largest coding units. In HM-7.0 reference codes, deblocking filter (DF) and SAO filter are implemented as two picture-based in-loop filtering tools. However, for hardware implementation, it is desirable to implement them as block-based processing to reduce the cost of internal memory and system bandwidth associated with storing or accessing a whole picture according to the HM-7.0 reference codes. When the block-based processing is used in a hardware system, pipeline architecture for block-based DF and SAO with parallel processing can be adopted. To achieve the block-based, pipelined and parallel processing, it is required that the LCU raster scan processing order defined by the HEVC syntax is followed by the encoder and decoder.

Comparing to whole-picture based processing, block-based processing for DF and SAO can significantly reduce the hardware cost. However, it still requires some overhead to maintain the neighboring pixels between LCUs, LCU rows or tiles according to the decoding order. FIGS. 4A-4C show examples of LCU raster scan order and the corresponding neighboring pixel rows or columns to be buffered for SAO processing across an LCU boundary, LCU-row boundary or tile boundary. As shown in FIG. 4A, the processing sequence of LCUs is from LCU0 to LCU1. The data of neighboring pixels 410 on the left side of the LCU boundary 411 between LCU0 and LCU1 are maintained (need to be stored). Similarly, the processing sequence of LCU rows in FIG. 4B is from left LCU to right LCU of each LCU row. After the last LCU in each LCU row is processed, the SAO processing continues to the first LCU in the next LCU row as indicated by the dashed arrowed lines 425. The neighboring pixels 421 and 422 on the top of the LCU row boundaries 423 and 424 need to be stored and read back before the SAO processing is applied to the LCUs of a next LCU row. The processing sequence for LCUs in tiles is shown in FIG. 4C. After the last LCU in a row of LCUs is processed, the SAO processing continues to the first LCU in the next row of LCUs as indicated by the dashed arrowed lines 435. During the process, the neighboring pixels 431 and 432 on the left side of the respective tile boundaries 433 and 434 need to be stored and read back for SAO processing during or after DF processing is applied to the LCUs of a next tile.

In hardware decoder for the H.264/AVC standard, line buffer is used to store the neighbor pixels for DF between two neighboring MB-rows (macroblock rows). In HEVC, SAO is applied to DF processed video data. The DF processing relies on data on both sides of a block boundary. Therefore, some data at the boundary of a current MB-row may have to wait until the next MB-row is available. In HEVC, SAO is applied to DF-processed data. Furthermore, the SAO processing also relies on neighboring data (the EO type processing). Accordingly, a line buffer is often used to store pre-DF data, DF processed, and/or SAO processed data for neighboring pixels at the boundary. The use of line buffer can enhance system speed and reduce system bandwidth associated with external memory access. However, the line buffer is often implemented as on-chip memory and the use of line buffer will increase chip cost. Therefore, the size of line buffer need carefully managed to avoid high cost.

The line buffer requirement associated with DF and SAO processing of the Luma component for an LCU row based HEVC system is shown in FIG. 5A. For the top LCU row 512, the horizontal DF processing can be applied to all rows (i.e., A to J) across a vertical boundary (not shown in FIG. 5A). However, the vertical DF processing needs to buffer neighboring four neighboring rows (i.e., G, H, I and J) of vertical DF-processed pixels on the upper side of LCU boundary 510 before the next LCU row 514 becomes available. However, the vertical DF processing according to HEVC may only change three pixel values across the boundary (i.e., pixel lines H, I and J). In other words, pixel line G will no longer be updated when processing the next LCU-row. The deblocked data of line G from vertical DF can be used by SAO. Therefore, SAO processing (i.e. EO type) for the top LCU row 512 can be applied up to pixel line F. In FIG. 5A, box 516 indicates the 3×3 window for pixel "a" in the center of the 3×3 window. Since the processing of pixel "a" in line G may require pixels from lines F and H, pixel "a" cannot be processed by SAO at this time. Therefore, for pixel lines G to J, the SAO processing has to wait until the new LCU row becomes available. When the bottom LCU row 514 becomes available, SAO processing will start from line G after DF is finished. Since the SAO processing for line G will reference to line F, it is required to buffer line F for SAO processing in addition to pixel lines G, H, I and J required for vertical DF processing across a horizontal boundary.

Figure 5B:
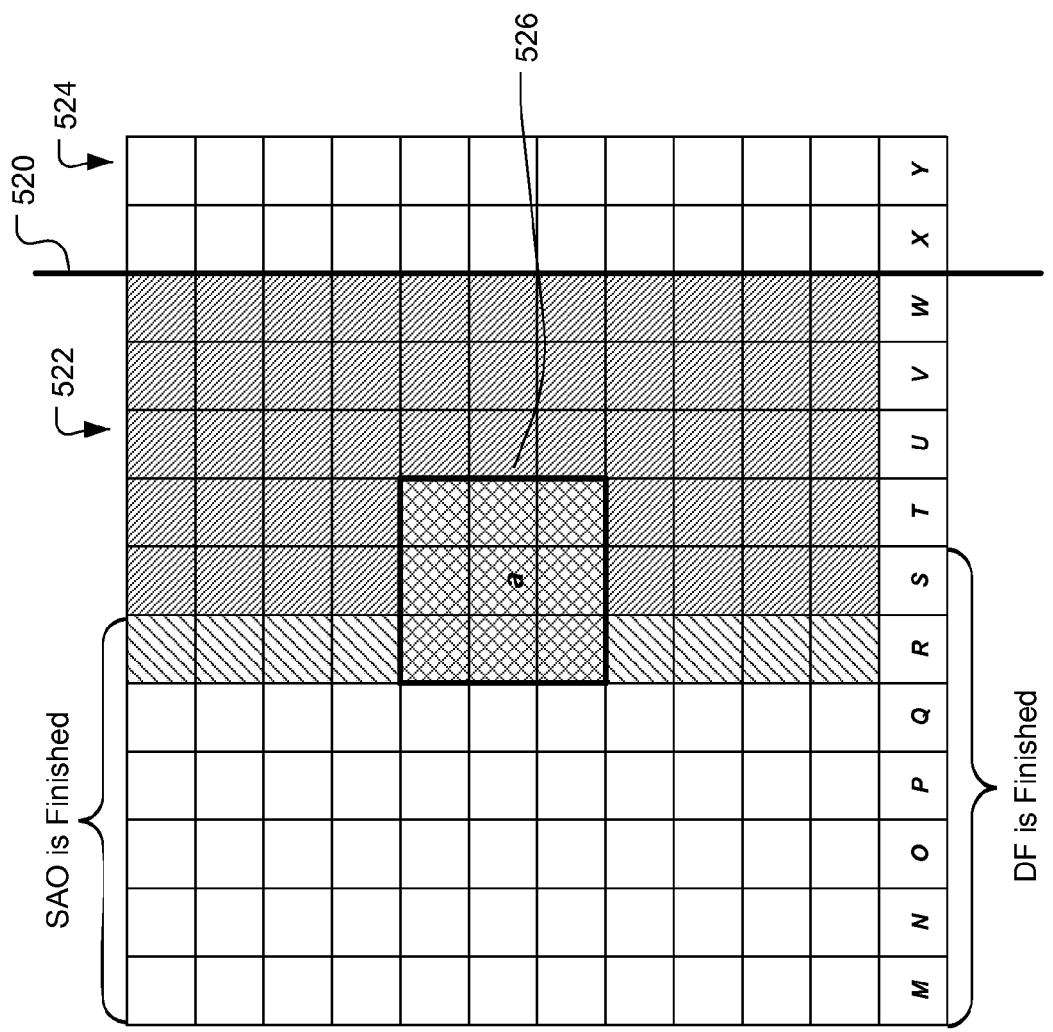
FIG. 5B illustrates an example of neighboring pixel lines to be buffered for DF and SAO processing across an LCU boundary or tile boundary for Luma.

In the case of LCU boundary or tile boundary 520 for the Luma signal, as shown in FIG. 5B, DF processing needs to buffer neighboring pixel columns T, U, V and W for the next LCU or the next tile 524. Therefore, columns T to W cannot be used for the SAO processing until the next LCU or tile becomes available. In FIG. 5B, box 526 indicates the 3×3 window for pixel "a" in the center of the 3×3 window. Since the processing of pixel "a" in column S may require pixels from columns R and T, pixel "a" cannot be processed by SAO at this time. In this case, SAO processing for the left-side LCU or tile 522 can be applied only up to pixel column R. When the right-side LCU or tile 524 becomes available, SAO processing will start from column S after DF is finished. The SAO processing for column S will reference to column R. Therefore, columns R and S have also to be buffered for SAO processing in addition to the columns T, U, V and W required for DF processing.

Figure 6A:
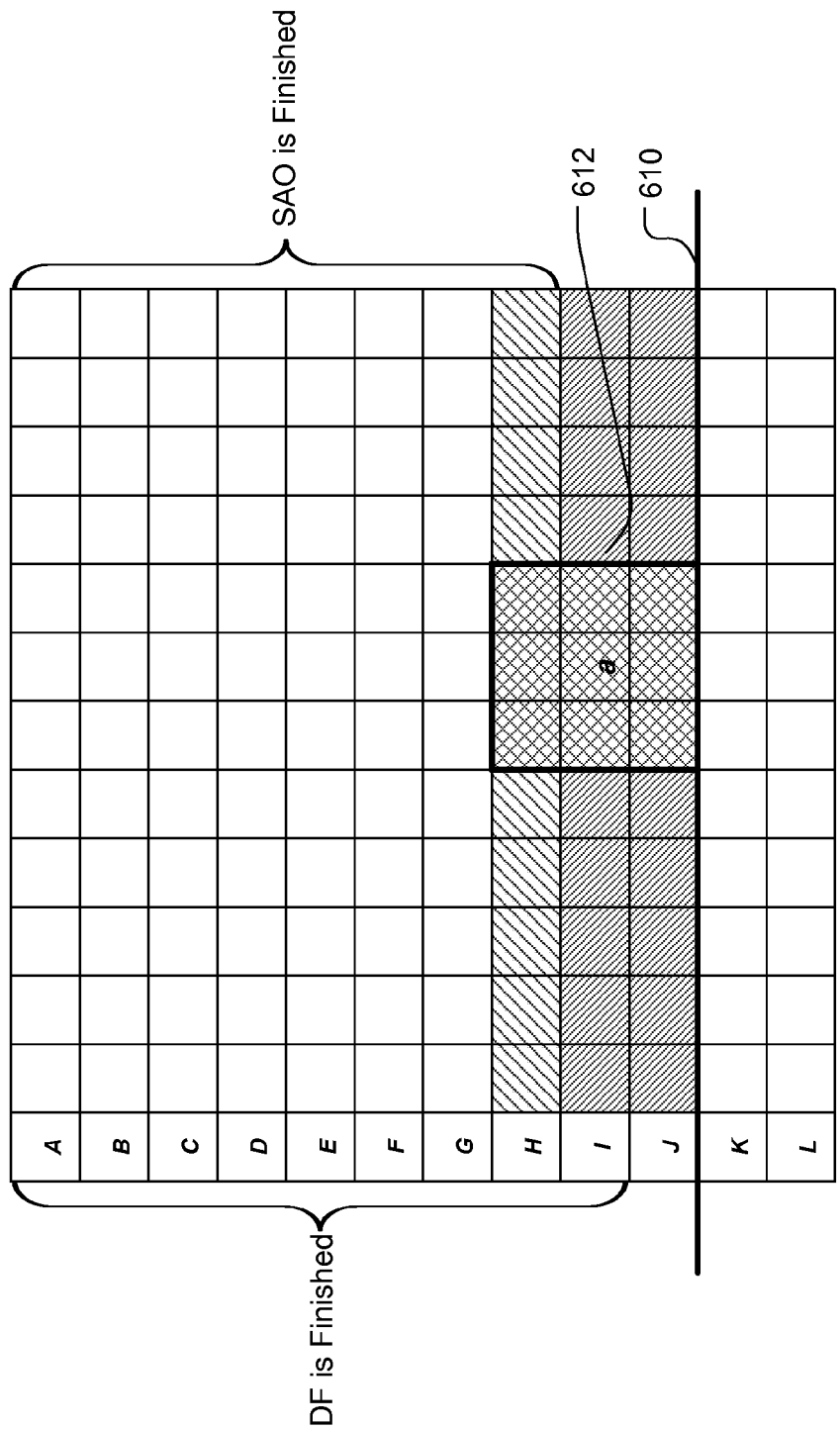
FIG. 6A illustrates an example of neighboring pixel lines to be buffered for DF and SAO processing across an LCU-row boundary for Chroma.
Figure 6B:
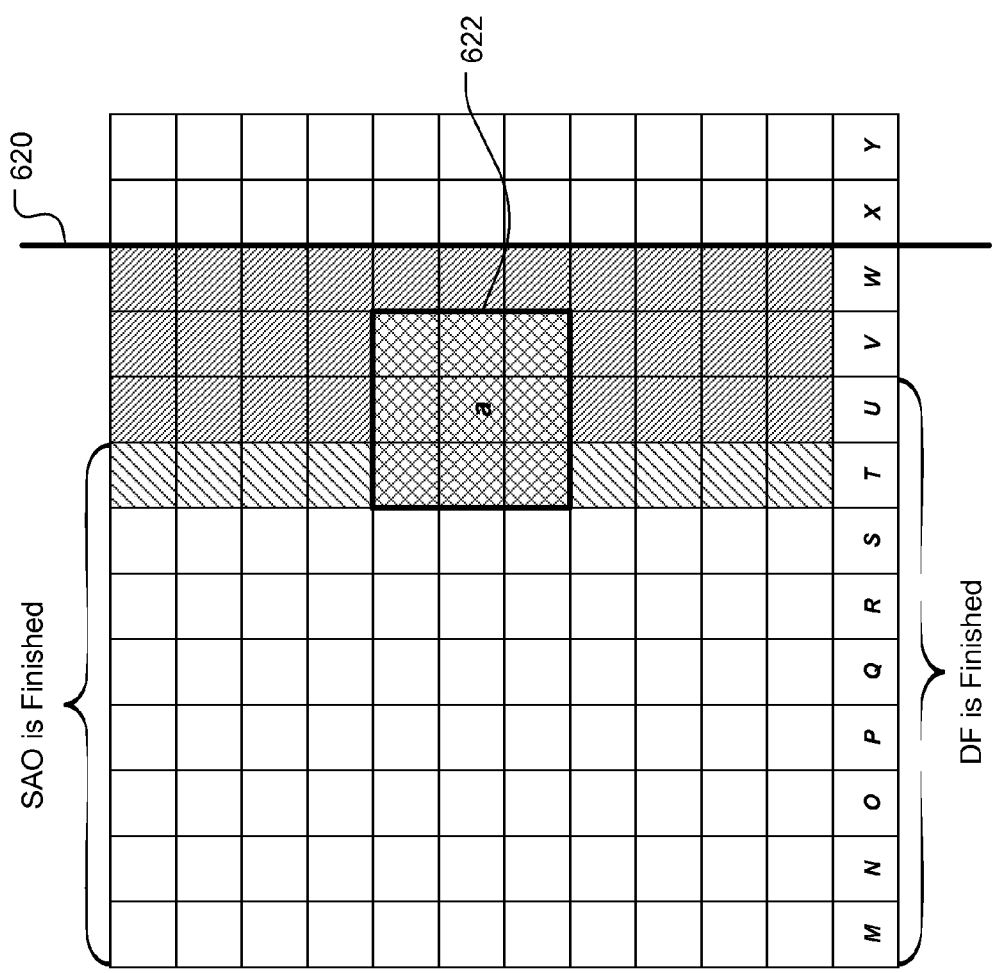
FIG. 6B illustrates an example of neighboring pixel lines to be buffered for DF and SAO processing across an LCU boundary or tile boundary for Chroma.

The line buffer requirement associated with DF and SAO processing of the Chroma component for an LCU row based HEVC system is shown in FIG. 6A. Line H is required to be stored for SAO processing in addition to lines I and J required for DF processing for a horizontal LCU-row boundary 610. Box 612 indicates pixel "a" to be processed may require reference pixels from lines H and J. In the case of a vertical LCU boundary or tile boundary 620, as shown in FIG. 6B, columns T and U are required to be stored for SAO processing in addition to columns V and W for DF processing. Box 622 indicates pixel "a" to be processed may require reference pixels from columns T and V.

In one embodiment of the present invention, the required line buffer size for SAO processing across an LCU boundary, LCU-row boundary or tile boundary is reduced. When EO types are used for SAO processing, the differences (or comparison results) between the reference pixels and the to-be-processed pixel are calculated in order to determine a category for the to-be-processed pixel. As shown in Table 1, the category for the to-be-processed pixel can be determined based on whether the to-be-processed pixel is greater than, equal to, or smaller than a reference pixel. The comparison results can be represented as a tri-level value (i.e., ">", "=" or "<"). Alternatively, the tri-level value can be represented as {1, 0, −1} which is related to the sign and magnitude of the current pixel and the reference pixel according to the present invention. The tri-level data is a much compact representation than the pixel data. Accordingly, the tri-level data representation can be used to reduce the line buffer requirement. The line buffer to store DF-processed data for SAO processing can use the tri-level representation.

Figure 7B:
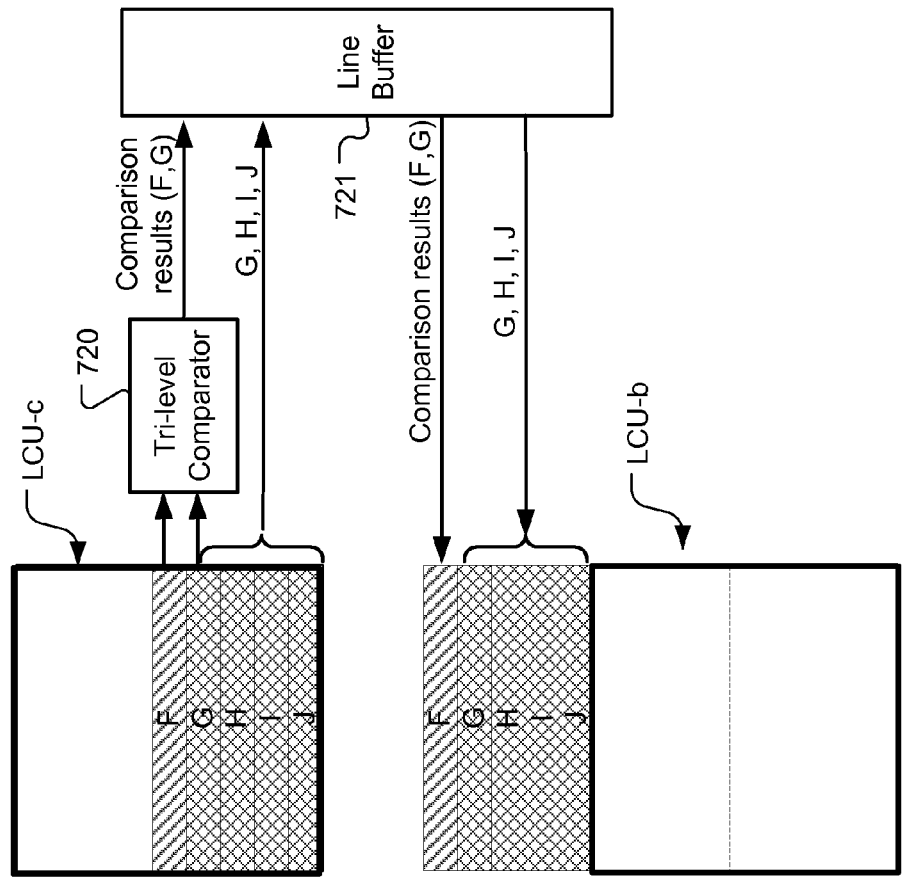
FIG. 7B illustrates an example of neighboring pixel data to be buffered for SAO processing of the Luma component across a horizontal LCU-row boundary according to an embodiment of the present invention.
Figure 7A:
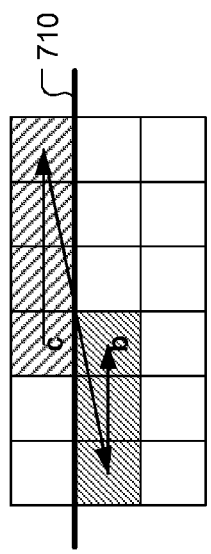
FIG. 7A illustrates an example of LCU processing order across a horizontal LCU-row boundary during SAO processing according to an embodiment of the present invention.

As shown in FIG. 5A for the Luma component in the top LCU row 512, the SAO processing for pixel "a" may require (for EO at 90°, 135° and 45°) reference pixels from lines F and H to determine the SAO category. Since line H has to be store for vertical DF processing on lines H, I and J when the next LCU row becomes available, comparison between pixel "a" and a reference pixel in line H can be performed when the next LCU row becomes available. On the other hand, if comparison result (represented in a tri-level value) between pixel "a" and a reference pixel in line F can be stored, it is more compact than storing the respective pixel data. The comparison results can be retrieved (i.e., read back) before SAO processing of the next LCU row. FIG. 7A and FIG. 7B illustrate an embodiment according to the present invention to store tri-level comparison data for SAO processing across an LCU-row boundary. Accordingly, when SAO processing is applied to the top of LCU row of the horizontal LCU-row boundary as shown in FIG. 7A (the LCU raster scan order is shown by the arrows), the difference between line G and F of LCU-c is calculated first by tri-level comparator 720 according to the EO type of each pixel in line G. The tri-level comparison results can be generated using three separate comparison logics for ">", "=" and "<" separately.

While a 2-bit data can be used to represent each tri-level comparison result, there are many other data representations that can be used to practice the present invention. Five examples for representation of comparison results are illustrated. It is understood that the examples are not meant for providing an exhaustive list of all possible data representation for the tri-level comparison results. One embodiment of the present invention uses 8 bits to represent the tri-level value of each comparison result. In this embodiment, it needs the same line buffer size as the original SAO if each pixel of reconstructed video data is expressed by 8 bits. In another embodiment, 2 bits are used to represent the tri-level comparison result between the target pixel in line G and its neighboring pixel in line F. Multiple comparison results can also be packed and represented by a data using more bits. For example, three comparison results can be packed and represented by 5 bits. Since there are a total of $3^3$ (equal to 27) possible combinations for the three comparison results, a 5-bit data having a total of $2^5$ (equal to 32) possible values will be sufficient to represent the three comparison results. The average bit size of each tri-level comparison result is only about 1.67 bits, which achieve further reduction of data size requirement. Another embodiment uses 8 bits to represent five tri-level comparison results. In this case, the total number of possible combination of five tri-level comparison results is $3^5$ (equal to 243), which is smaller than the total number of values 256 that can be represented by 8 bits ($2^8$). Therefore, 8 bits are sufficient for five tri-level comparison results. The average bit size of each tri-level value is 1.60 bits.

The data representation methods for tri-level comparison results mentioned above can be combined. Accordingly, the representations corresponding to 2 bits for one tri-level comparison result, 5 bits for three tri-level comparison results and 8 bits for five tri-level comparison results can be used in a mixed fashion for multiple tri-level comparison results. For example, 26 bits can be used to represent sixteen tri-level comparison results. In this example, 26 bits can be divided to three groups of 8 bits for three sets of five tri-level comparison results and the remaining 2 bits for one tri-level comparison result. One embodiment of the present invention uses a multi-level cell (MLC) storage, such as a triple-level cell, to store one tri-level comparison result. By choosing multiple levels of electrical charge, the MLC storage can store more than one bit per cell. For example, most MLC NAND flash memory has four possible states per cell. Therefore, an MLC cell of the NAND flash memory can store one tri-level comparison result.

A system for SAO processing incorporating an embodiment of the present invention is illustrates in FIG. 7A and FIG. 7B. In FIG. 7A, an LCU-row boundary 710 is shown, where the processing order for the LCUs across the boundary is shown by the arrows. The detailed processing for two blocks LCU-c and LCU-b across the boundary is illustrated in FIG. 7B. The tri-level comparison result can be calculated based on pixel data from lines G and F using a tri-level comparator 720 as shown in FIG. 7B. While a tri-level comparator 720 is used as an example to generate the tri-level comparison results, other processors may also be used to produce the tri-level comparison results. The tri-level comparison results between lines G and F, along with pixel lines G to J, are stored in line buffer 721. When the bottom LCU (i.e., LCU-b) becomes available, the pixel lines G to J can be read back from line buffer 721 for further DF processing. After DF processing is applied to pixel lines G to J, the SAO processing can now be applied to pixel lines G to J. SAO processing for line G requires comparison results between lines G and F. Accordingly, the comparison results between lines G and F stored in line buffer 721 are read back for SAO processing of line G.

For the Chroma component, the SAO processing across a horizontal LCU-row boundary incorporating an embodiment of the present invention is similar to the SAO processing of the Luma component. In this case, the tri-level comparison results between lines H and I of the current LCU is calculated using a tri-level comparator according to the EO type of line I as shown in FIG. 6A. The tri-level comparison results between lines H and I, along with pixel lines I and J of the current LCU are stored in the line buffer. When the next LCU becomes available, pixel lines I and J of the previous LCU are read back from the line buffer and DF processing is applied to lines I and J. When the SAO is applied to line I, the tri-level comparison results between lines H and I are read back from the line buffer.

Figure 8B:
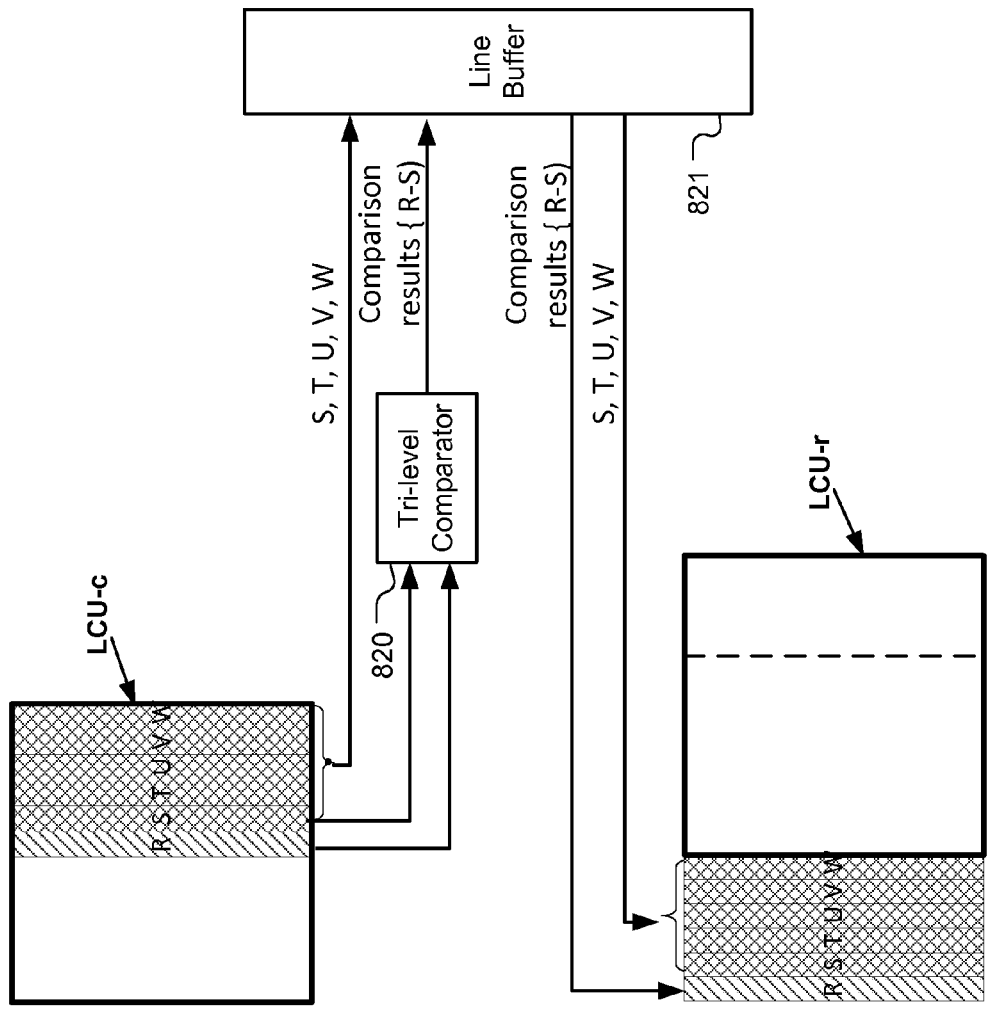
FIG. 8B illustrates an example of neighboring pixel data to be buffered for SAO processing of the Chroma signal across a vertical LCU boundary or tile boundary according to an embodiment of the present invention.
Figure 8A:
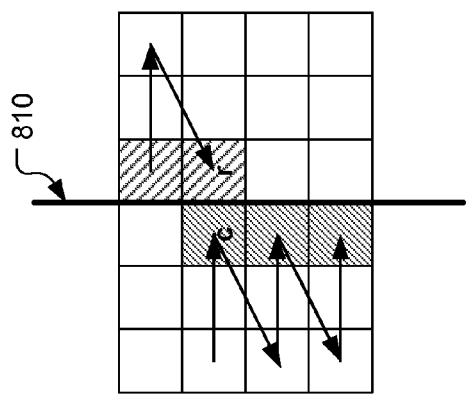
FIG. 8A illustrates an example of LCU processing order across for a vertical tile boundary during SAO processing according to an embodiment of the present invention.

A system for SAO processing incorporating an embodiment of the present invention is illustrates in FIG. 8A and FIG. 8B. In FIG. 8A, a tile boundary 810 is shown, where the processing order for the LCUs across the boundary is shown by the arrows. The detailed processing for two blocks LCU-c and LCU-r across the boundary is illustrated in FIG. 8B.

When the SAO processing is applied to LCU-c on the left side of the tile boundary 810, columns T to W are not yet processed by DF. Since values in columns T to W may be modified after DF, EO-based SAO can only applied up to column R. EO-based SAO for column S required data from column R. Therefore, the differences between column S and R of LCU-c are calculated using a tri-level comparator 820 according to the EO type of column S. The tri-level comparison results along with column S to W are stored in line buffer 821. When LCU-r on the right side of the tile boundary becomes available, the SAO processing can be applied to column S of LCU-c. Column S to W will be read back from line buffer 821 so that the DF processing can be applied to columns S to W. After columns S to W are DF processed, column S is ready for SAO processing. The tri-level comparison results between columns S and R of LCU-c are read back from line buffer 821.

For the Chroma component, the SAO processing across a vertical LCU or tile boundary incorporating an embodiment of the present invention is similar to the SAO processing of the Luma component. In this case, the tri-level comparison results between columns T and U of the current LCU is calculated using a tri-level comparator according to the EO type of column U as shown in FIG. 6B. The tri-level comparison results between columns T and U, along with pixel columns U to W of the current LCU are stored in the line buffer. When the next LCU becomes available, pixel columns U to W of the previous LCU are read back from the line buffer and DF processing is applied to columns U to W. When the SAO is applied to column U, the tri-level comparison results between columns T and U are read back from the line buffer.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression or decompression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of applying deblocking and sample adaptive offset (SAO) processing to reconstructed video data, the method comprising:
generating reconstructed video data by decoding a video bitstream using entropy decoding, inverse scaling, inverse quantization, inverse transform, intra/inter prediction or a combination thereof;
applying deblocking filter to an image unit of the reconstructed video data to generate deblocked video data;
determining tri-state comparison results for at least a portion of one partially deblocked or to-be-deblocked pixel row or column of the image unit according to SAO type of said at least a portion of one partially deblocked or to-be-deblocked pixel row or column, wherein the tri-state comparison results are determined for each pixel of said at least a portion of one partially deblocked or to-be-deblocked pixel row or column by comparing said each pixel of said at least a portion of one partially deblocked or to-be-deblocked pixel row or column with a neighboring deblocked pixel of a previous row or column, and wherein the tri-state comparison results comprise "larger", "equal" and "smaller" states; and
storing the tri-state comparison results in a buffer, where the tri-state comparison results are read back from the buffer after a part of a subsequent image unit is available to enable deblocking process on said at least a portion of one partially deblocked or to-be-deblocked pixel row or column and before SAO processing on said at least a portion of one partially deblocked or to-be-deblocked pixel row or column.

2. The method of claim 1, wherein the tri-state comparison result is represented by an 8-bit data.

3. The method of claim 1, wherein the tri-state comparison result is represented by a 2-bit data.

4. The method of claim 1, wherein a first number of tri-state comparison results is jointly represented by a multi-bit data having a second number of bits.

5. The method of claim 4, wherein three tri-state comparison results are jointly represented by a 5-bit data.

6. The method of claim 4, wherein five tri-state comparison results are jointly represented by an 8-bit data.

7. The method of claim 4, wherein sixteen tri-state comparison results are jointly represented by a 26-bit data.

8. The method of claim 1, wherein the tri-state comparison result is stored in MLC storage (multi-level cell storage).

9. The method of claim 8, wherein each tri-state comparison result is stored in one cell of the MLC storage, wherein each cell supports three levels or more.

10. The method of claim 1, wherein the image unit corresponds to a largest coding unit (LCU) or a shifted LCU.

11. The method of claim 10, wherein the subsequent image unit corresponds to a next LCU in a current LCU-row located at right side of a current LCU for LCU-row based decoding, or a neighboring LCU in a next LCU-row for the LCU-row based decoding wherein the neighboring LCU is located below the current LCU.

12. The method of claim 10, wherein the subsequent image unit corresponds to a neighboring LCU in a next tile for tile based decoding, wherein the neighboring LCU is located at right side of a current LCU.

13. An apparatus of applying deblocking and sample adaptive offset (SAO) processing to reconstructed video data, the apparatus comprising:
- means for generating reconstructed video data by decoding a video bitstream using entropy decoding, inverse scaling, inverse quantization, inverse transform, intra/inter prediction or a combination thereof;
- means for applying deblocking filter to an image unit of the reconstructed video data to generate deblocked video data;
- means for determining tri-state comparison results for at least a portion of one partially deblocked or to-be-deblocked pixel row or column of the image unit according to SAO type of said at least a portion of one partially deblocked or to-be-deblocked pixel row or column, wherein the tri-state comparison results are determined for each pixel of said at least a portion of one partially deblocked or to-be-deblocked pixel row or column by comparing said each pixel of said at least a portion of one partially deblocked or to-be-deblocked pixel row or column with a neighboring deblocked pixel of a previous row or column, and wherein the tri-state comparison results comprise "larger", "equal" and "smaller" states; and
- means for storing the tri-state comparison results in a buffer, where the tri-state comparison results are read back from the buffer after a part of a subsequent image unit is available to enable deblocking process on said at least a portion of one partially deblocked or to-be-deblocked pixel row or column and before SAO processing on said at least a portion of one partially deblocked or to-be-deblocked pixel row or column.

14. The apparatus of claim 13, wherein the tri-state comparison result is represented by a 2-bit data.

15. The apparatus of claim 13, wherein a first number of tri-state comparison results is jointly represented by a multi-bit data having a second number of bits.

16. The apparatus of claim 15, wherein three tri-state comparison results are jointly represented by a 5-bit data.

17. The apparatus of claim 15, wherein five tri-state comparison results are jointly represented by an 8-bit data.

18. The apparatus of claim 15, wherein sixteen tri-state comparison results are jointly represented by a 26-bit data.

19. The apparatus of claim 13, wherein the tri-state comparison result is stored in MLC storage (multi-level cell storage).

20. The apparatus of claim 19, wherein each tri-state comparison result is stored in one cell of the MLC storage, wherein each cell supports three levels or more.

* * * * *